(12) United States Patent
Huang et al.

(10) Patent No.: US 11,720,253 B2
(45) Date of Patent: Aug. 8, 2023

(54) ACCESS OF A MEMORY SYSTEM BASED ON FRAGMENTATION

(71) Applicant: Micron Technology, Inc., Boise, ID (US)

(72) Inventors: Jun Huang, Boise, ID (US); Bhagyashree Bokade, Boise, ID (US); Violet Gomm, Boise, ID (US); Deping He, Boise, ID (US); Lavanya Sriram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 17/646,413

(22) Filed: Dec. 29, 2021

(65) Prior Publication Data

US 2022/0206689 A1 Jun. 30, 2022

Related U.S. Application Data

(60) Provisional application No. 63/132,804, filed on Dec. 31, 2020.

(51) Int. Cl.
*G06F 3/06* (2006.01)
(52) U.S. Cl.
CPC ........... *G06F 3/0611* (2013.01); *G06F 3/064* (2013.01); *G06F 3/0679* (2013.01)

(58) Field of Classification Search
CPC ...... G06F 3/0611; G06F 3/064; G06F 3/0679; G06F 3/0659; G06F 3/0671; G06F 3/061; G06F 3/0644
See application file for complete search history.

(56) References Cited

U.S. PATENT DOCUMENTS

| 2011/0289263 | A1* | 11/2011 | McWilliams | ....... G06F 12/0802 |
| | | | | 711/E12.008 |
| 2019/0146925 | A1* | 5/2019 | Li | ....... G06F 12/0246 |
| | | | | 711/103 |

\* cited by examiner

*Primary Examiner* — David Yi
*Assistant Examiner* — Dustin B. Fulford
(74) *Attorney, Agent, or Firm* — Holland & Hart LLP (57) ABSTRACT

Methods, systems, and devices for access of a memory system based on fragmentation are described. The memory system may receive a first message indicating a set of data that the memory system is to store using a fragmentation-based write procedure. The memory system may, based on the first message, determine blocks of a memory device that satisfy a fragmentation threshold. After determining the blocks, the memory system may transmit to the host system a second message that indicates the memory system is ready to receive the set of data indicated in the first message. The memory system may then store the set of data in the determined blocks based on transmitting the second message.

25 Claims, 6 Drawing Sheets

ACCESS OF A MEMORY SYSTEM BASED ON FRAGMENTATION

CROSS REFERENCE

The present Application for Patent claims the benefit of U.S. Provisional Patent Application No. 63/132,804 by HUANG et al., entitled "ACCESS OF A MEMORY SYSTEM BASED ON FRAGMENTATION," filed Dec. 31, 2020, assigned to the assignee hereof, and expressly incorporated by reference herein.

FIELD OF TECHNOLOGY

The following relates generally to one or more systems for memory and more specifically to access of a memory system based on fragmentation.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may use a write procedure to facilitate the storage of a file in memory. For example, if the memory system receives a file from a host system, the memory system may implement the write procedure to identify blocks of memory in which to store the file. If the blocks are severely fragmented (e.g., already store a lot of data), the data from the file may be spread across many blocks, which may increase latency and power consumption relative to storing the data from the file in fewer blocks, among other disadvantages. This type of storage latency may be exacerbated if the file to be stored is a large such as a gaming file.

According to the techniques described herein, a memory system may reduce the latency and power consumption associated with storing a file by using a fragmentation-based write procedure in which the memory system selects mildly fragmented blocks (e.g., relatively empty blocks) to write the file. Thus, fewer blocks may be used to store the file, which may reduce the amount of time and power it takes to write the file to memory (or read the file from memory), among other benefits.

Features of the disclosure are initially described in the context of systems and devices as described with reference to FIG. 1. Features of the disclosure are described in the context of memory blocks and process flows as described with reference to FIGS. 2-4. These and other features of the disclosure are further illustrated by and described with reference to an apparatus diagram and a flowchart that relate to accessing a memory system based on fragmentation as described with reference to FIGS. 5 and 6.

Figure 1:
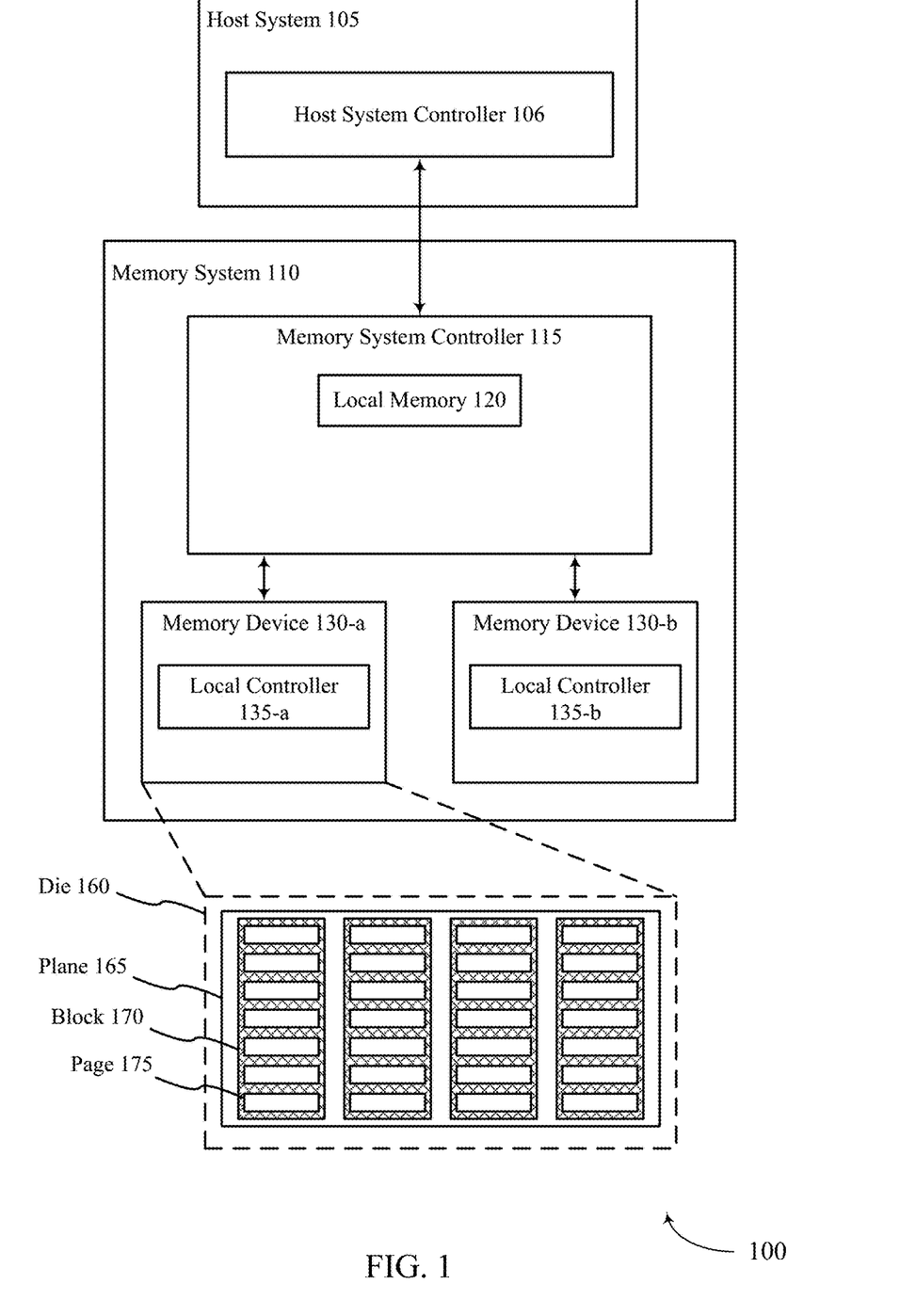
FIG. 1 illustrates an example of a system that supports access of a memory system based on fragmentation in accordance with examples as disclosed herein.

FIG. 1 illustrates an example of a system 100 that supports access of a memory system based on fragmentation in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include ROM or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as DRAM memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wearout considerations, for example. In some cases, one or more copies of an L2P mapping table may be stored within the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support access of a memory system based on fragmentation. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system 110 may store data for the host system 105. If the memory system 110 receives data from the host system 105 for storage, the memory system 110 may implement an address-based write procedure to identify blocks 170 in which to store the data. But use of the address-based write procedure may increase storage latency and power consumption (relative to other techniques) if the blocks are severely fragmented, because the decreased capacity of the blocks results in the data being written to many blocks. Additionally, storing the data across many blocks 170 may increase garbage collection operations of the memory system 110, which may negatively impact performance.

According to the techniques described herein, the memory system 110 may implement a fragmentation-based write procedure to improve performance relative to other write procedures, such as an address-based write procedure. As part of the fragmentation-based write procedure, the memory system 110 may identify mildly fragmented blocks 170 for storing a data set (e.g., blocks that satisfy a fragmentation criteria). Using mildly fragmented blocks may allow the memory system 110 to store the data set in fewer blocks 170 relative to other techniques. Thus, the memory system 110 may reduce the latency and power consumption associated with storing the data, and decrease garbage collection operations, relative to other techniques, among other advantages. Additionally or alternatively, storing the data in less fragmented blocks may also reduce the latency and power consumption associated with reading the data. Because the fragmentation-based write procedure may not be suitable for all files, the host system 105 may identify files for which the memory system 110 may use the fragmentation-based write procedure. For example, the fragmentation-based write procedure may be used for gaming files, large files, or a combination thereof. The host system 105 and the memory system 110 may also engage in a handshake procedure to ensure that both systems operate in a compatible manner for the fragmentation-based write procedure.

A fragmentation-based write procedure may also be referred to as an expedited write procedure, or an accelerated write procedure, among other suitable terminology. Although described separately, aspects of the address-based write procedure and aspects of the fragmentation-based address procedure may be combined. For example, among mildly fragmented blocks, the memory system 110 may select one or more sets of the blocks that have sequential addresses, which may further improve write operation latency.

Figure 2:
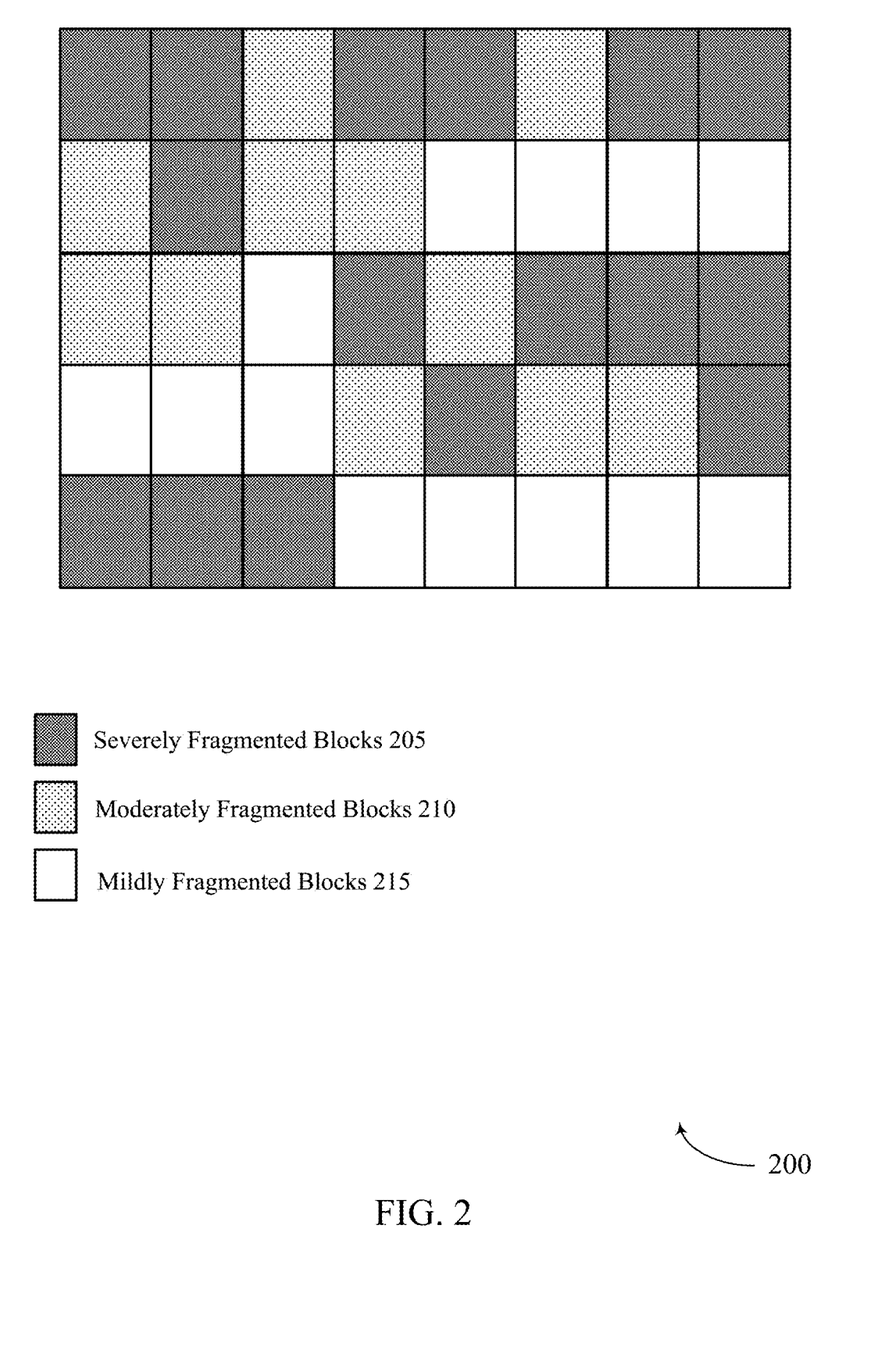
FIG. 2 illustrates an example of blocks that support access of a memory system based on fragmentation in accordance with examples as disclosed herein.

FIG. 2 illustrates an example of blocks 200 that support access of a memory system based on fragmentation in accordance with examples as disclosed herein. The blocks 200 may be examples of blocks 170 as described with reference to FIG. 1. Thus, the blocks 200 may be examples of blocks of a memory die in a memory device of a memory system. The memory system may use the fragmentation-based write procedure to identify blocks 200 that satisfy a fragmentation condition so fewer blocks (relative to other techniques) can be used to store certain files. Using fewer blocks to store a file may reduce storage latency and power consumption (relative to other write procedures) and provide other advantages such as decreased garbage collection operations.

The memory system 110 may classify the blocks 200 (e.g., assign the blocks 200 fragmentation statuses) based on the fragmentation of the blocks. For example, the memory system 110 may classify the blocks 200 as blocks with severe fragmentation (severely fragmented blocks 205), blocks with moderate fragmentation (moderately fragmented blocks 210), or blocks with mild fragmentation (mildly fragmented blocks 215). The classification of a block may be based on a comparison of the fragmentation of the block with one or more classification thresholds or classification criteria. For example, if the memory system uses a first lower classification threshold and a second higher classification threshold, the memory system may classify blocks that fail to satisfy the first classification threshold as mildly fragmented blocks 215; the memory system may classify blocks that satisfy the first fragmentation threshold but fail to satisfy the second classification threshold as moderately fragmented blocks 210; and the memory system may classify blocks that satisfy the second classification threshold as severely fragmented blocks 205. Although described with reference to three classifications, the techniques described herein may be used with any quantity of classifications.

The fragmentation of a block may be based on (e.g., a function of) a variety of parameters (referred to as "fragmentation parameters") associated with the block, such as the amount of data stored in the block, the ratio of invalid to valid data stored in the block, and the quantity of sequential pages in the block available for writing (referred to as "empty" or "available" pages), among others. Higher amounts of stored data in a block may be associated with higher fragmentation relative to lower amounts of store data.

Similarly, a higher ratio of invalid to valid data stored in a block may be associated with higher fragmentation relative to a lower ratio (e.g., because the block is more likely to undergo a garbage collection operation). A higher quantity of sequential empty pages may be associated with a lower fragmentation relative to lower quantities (e.g., because writes to sequential pages may be faster than writes to non-sequential pages).

The memory system may monitor or track the fragmentation parameters of the blocks 200 and record them for later reference (e.g., during a fragmentation-based write procedure). For example, the memory system may record (e.g., store, log) the fragmentation parameters in one or more tables. Additionally or alternatively, the memory system may record the classification of the memory blocks in one or more tables. Thus, the memory system main maintain one or more tables that store fragmentation information for the blocks 200, where the term fragmentation information may be used to refer to fragmentation parameters, fragmentation classification, a numerical fragmentation value, or a combination thereof.

If implementing the fragmentation-based write procedure, the memory system may use the fragmentation information in the table(s) to determine which blocks 200 may be used to store a file. For example, the memory system may identify a set of the mildly fragmented blocks 215 to store a file that is subject to the fragmentation-based write procedure. As anther example, the memory system may reference the fragmentation parameters to generate a numerical fragmentation value (or reference a numerical fragmentation value directly) for comparison with a fragmentation threshold. In some examples, the fragmentation statuses may be associated with ranges of numerical fragmentation values. Thus, a memory system may use the fragmentation information for the blocks 200 to identify suitably fragmented blocks for storing a file.

Figure 3:
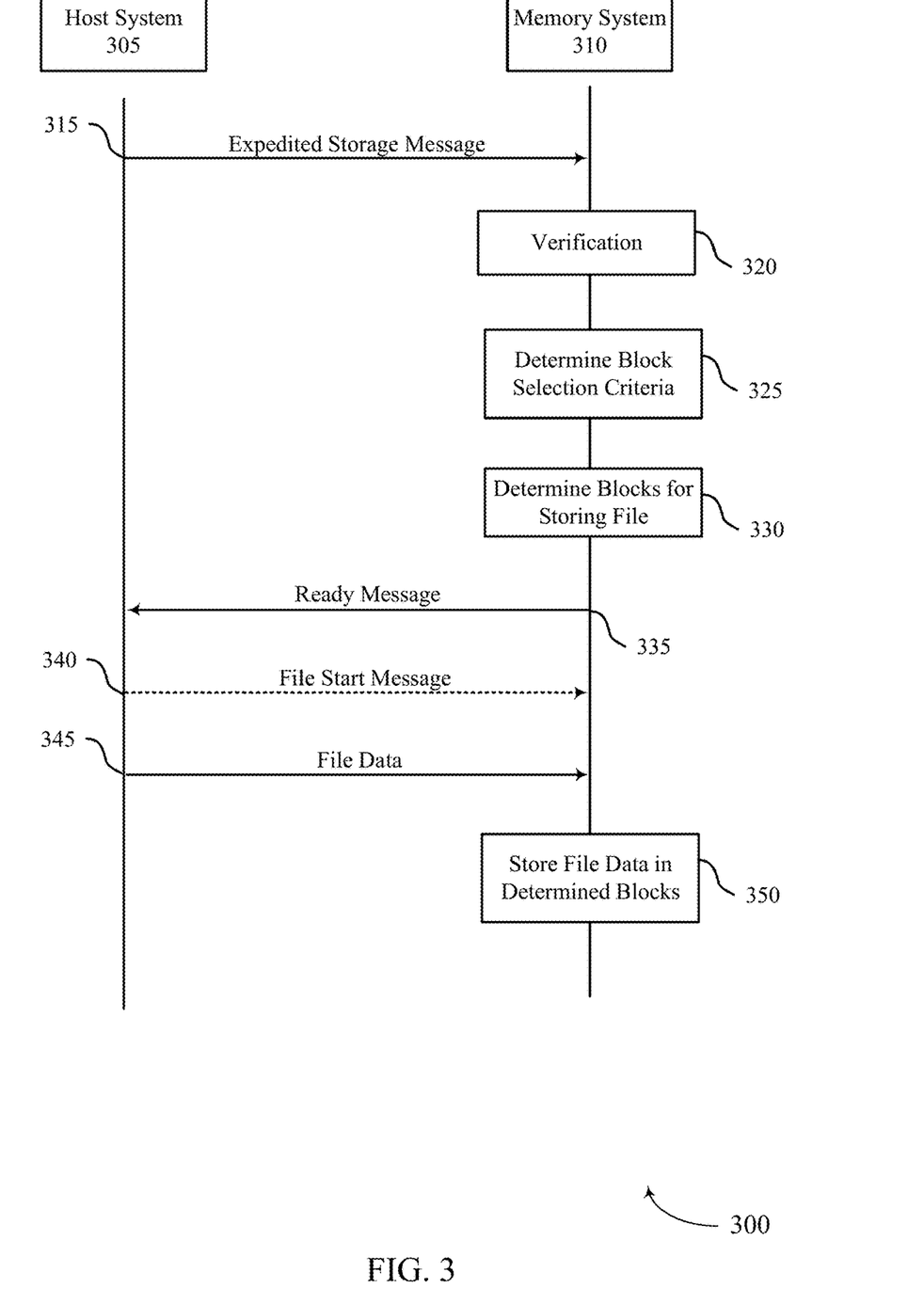
FIG. 3 illustrates an example of a process flow that supports access of a memory system based on fragmentation in accordance with examples as disclosed herein.

FIG. 3 illustrates an example of a process flow 300 that supports access of a memory system based on fragmentation in accordance with examples as disclosed herein. Aspects of the process flow 300 may be implemented by a host system 305 and a memory system 310, which may be examples of a host system 105 and memory system 110, respectively, as described with reference to FIG. 1. However, other types of systems may implement the process flow 300. The process flow 300 may illustrate the operations of the host system 305 and the memory system 310 during a handshake procedure for a fragmentation-based write procedure.

Aspects of the process flow 300 may be implemented by one or more controllers, among other components. Additionally or alternatively, aspects of the process flow 300 may be implemented as instructions stored in memory (e.g., firmware stored in a memory coupled with the host system 305 or the memory system 310). For example, the instructions, if executed by a controller (e.g., the host system controller 106, the memory system controller 115), may cause the controller to perform the operations of the process flow 300.

At 315, an expedited storage message may be communicated. For example, the host system 305 may communicate an expedited storage message to the memory system 310. The expedited storage message may indicate a file for which that the memory system 310 is to use the fragmentation-based write procedure. In some examples, the expedited storage message may indicate the file by including an identifier of the file. The expedited message may also include one or more bits that indicate which write procedure (e.g., the fragmentation-based write procedure or the address-based write procedure) the memory system 310 is to use for the file. Additionally, the expedited storage message may include an indication of the size of the file. The host system 305 may determine that a file is to be stored using the fragmentation-based write procedure based on the size of the file, the type of the file, an expected read frequency for the file, or a combination thereof, among other factors. In some examples, the file to be stored may be received by the host system 305 from another device.

At 320, a verification procedure may be performed. For example, the memory system 310 may verify that the host system 305 has the authority to issue the expedited storage message. The memory system 310 may verify the authority of the host system 305 by checking the file identifier against a public key. The file identifier may be generated by the host system 305 based on the serial number of memory system 310 and a chipset private key. In some cases, a private key may be associated with the system. The host system may generate a file identifier for the file to be stored in the memory system by signing a serial number of the memory system (e.g., the serial number associated with the UFS device descriptor) with the private key. The memory system may verify the file identifier using a public key associated with the system.

At 325, criteria for selecting blocks for storing the file may be determined. For example, the memory system 310 may determine a fragmentation threshold and a quantity of blocks for storing the file based on the type of file, the size of the file, or a combination thereof. For example, the memory system 310 may determine that storage of the file will use x blocks that satisfy a fragmentation threshold of y. The fragmentation threshold may define or represent a threshold amount of data, a threshold ratio of invalid to valid data, a threshold quantity of sequential pages, or a combination thereof, on a block basis.

The memory system 310 may determine the fragmentation threshold and the quantity of blocks based on the size of the file, fragmentation parameters of the blocks in the memory system, the fragmentation statuses of the blocks in the memory system, the numerical fragmentation values assigned to the blocks of the memory system, or a combination thereof, among other parameters. Thus, the fragmentation threshold used for the fragmentation-based write procedure may be determined dynamically (e.g., on a per-file basis, so that the fragmentation threshold for one file may be different that the fragmentation threshold for another file). The fragmentation threshold determined at 325 may be different than the classification threshold(s) used to assign fragmentation statuses to the blocks.

At 330, blocks for storing the file may be determined based on the selection criteria determined at 325. For example, the memory system 310 may determine the addresses of x blocks that satisfy the fragmentation threshold of y. The blocks may be determined based on the fragmentation information (e.g., fragmentation parameters, fragmentation statuses, numerical fragmentation values) for the blocks, the addresses of the blocks, or both. For example, the memory system 310 may determine one or more sets of blocks with sequential addresses that satisfy the fragmentation threshold.

At 335, a ready message may be communicated to the host system 305. For example, the memory system 310 may communicate a ready message to the host system 305 based on the memory system 310 determining (e.g., identifying) the blocks to store the file. The ready message may indicate that the memory system 310 is ready to receive the file.

At 340, a file start message may be communicated to the memory system 310. For example, the host system 305 may communicate a file start message to the memory system 310 based on (e.g., in response to) the ready message. The file start message may indicate when communication of the file (e.g., in sets of data) will begin. If the file start message is used, the host system 305 may refrain from communicating data other than the file data until the last set of data from the file has been communicated to the memory system 310. This way, the memory system 310 may know which data is to be stored using the fragmentation-based write procedure. The memory system 310 may detect the end of the file data based on a file end message from the host system 305 or based the size of the file (assuming that the memory system 310 monitors the amount of data received for the file as it comes in).

At 345, some or all of the file may be communicated to the memory system 310. For example, the host system 305 may begin to communicate data from the file to the memory system 310 based on the ready message. In some examples, the data from the file may be divided into (and communicated in) packets, or sets of data, and each packet may include an identifier that indicates the file to which the packet belongs. This way, the memory system 310 can determine which packets are to be stored using the fragmentation-based write operation even if the host system 305 intersperses packets from other files with the packets from the file. At 350, the memory system 310 may store data from the file in one or more of the blocks determined at 330. The memory system 310 may store the data from the file in the determined blocks in a sequential manner. If the memory system 310 runs out of blocks that satisfy the fragmentation threshold, the memory system 310 may update the fragmentation threshold (e.g., based on the amount of data remaining to be stored, based on fragmentation information) so that additional blocks become available to store data from the file. Thus, the memory system 310 may communicate with the host system 305 to implement a fragmentation-based write procedure for a file.

Alternative examples of the foregoing may be implemented, where some operations are performed in a different order than described, are performed in parallel, or are not performed at all. In some cases, operations may include additional features not mentioned below, or further operations may be added. Additionally, some operations may be performed multiple times or some combinations of operations may repeat or cycle.

Figure 4:
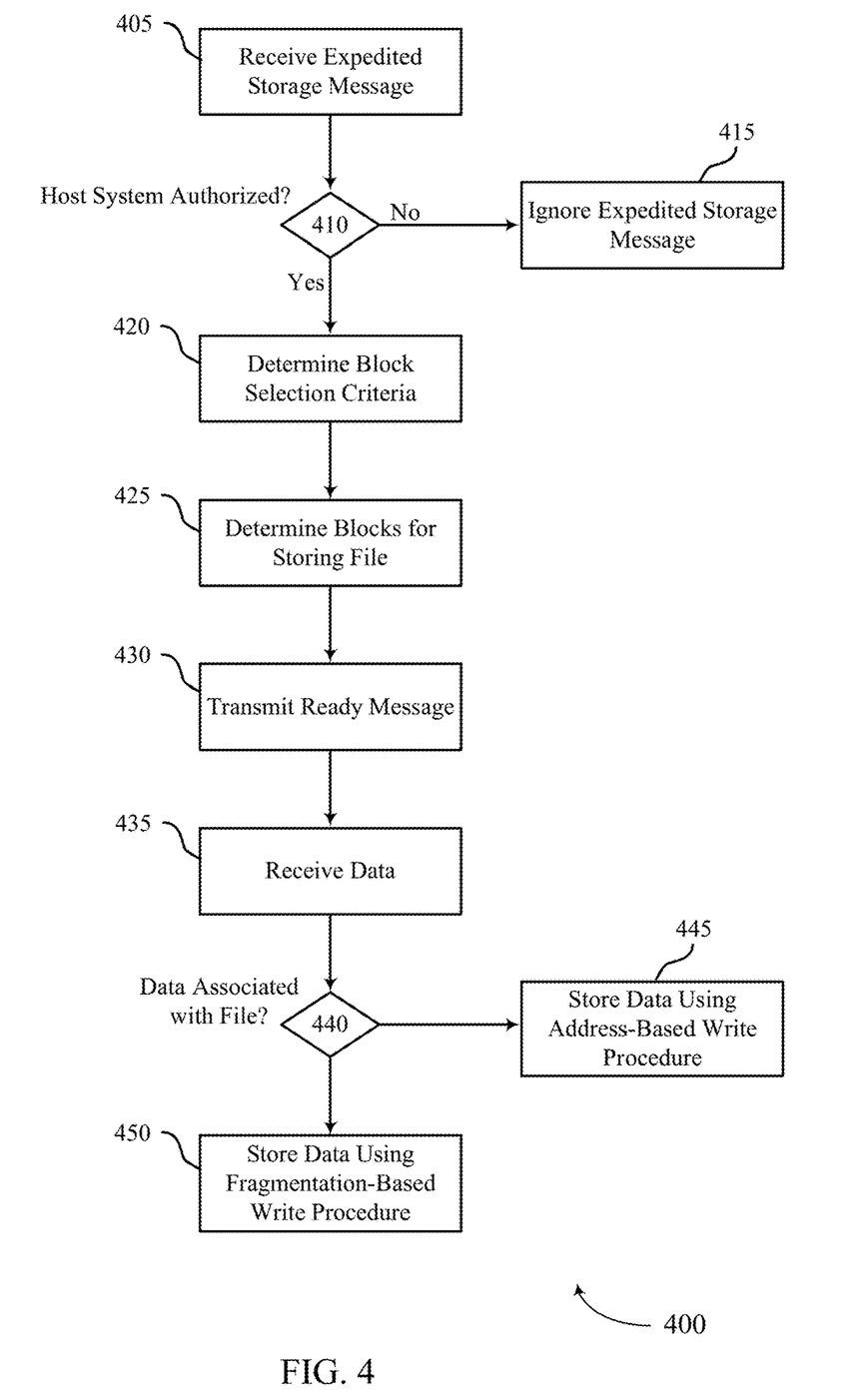
FIG. 4 illustrates an example of a process flow that supports access of a memory system based on fragmentation in accordance with examples as disclosed herein.

FIG. 4 illustrates an example of a process flow 400 that supports access of a memory system based on fragmentation in accordance with examples as disclosed herein. Aspects of the process flow 400 may be implemented by a memory system 110 or a memory system 310 as described with reference to FIGS. 1 and 3, respectively. However, other types of systems may implement the process flow 400. The process flow 400 may illustrate the operations of a memory system that implements a fragmentation-based write procedure. Aspects of the process flow 400 may be combined with aspects of the process flow 300.

At 405, an expedited storage message may be received. For example, the memory system may receive an expedited storage message from a host system. The expedited storage message may indicate a file that is to be stored using the fragmentation-based write procedure, among other information. At 410, it may be determined whether the host system is authorized to issue the expedited storage message. For example, the memory system may, for security reasons, determine whether the host system is authorized to issue the expedited storage message. If, at 410, it is determined that the host system is not authorized to issue the expedited storage message, the memory system may proceed to 415 and ignore the expedited storage message, among other protective measures.

If, at 410, it is determined that the host system is authorized to issue the expedited storage message, the memory system may proceed to 420. At 420, the criteria for selecting blocks for storing the file may be determined. For example, the memory system may determine the criteria as described with reference to FIG. 3. At 425, blocks for storing the file may be determined. For example, the memory system may determine the blocks based on the criteria determined at 425 and fragmentation information for the blocks as described with reference to FIG. 3.

At 430, a ready message may be transmitted. For example, the memory system may transmit a ready message to the host system based on determining the blocks at 425. At 435, data may be received. For example, the memory system may receive data from the host system. At 440, the memory system may determine whether the data is associated with the file indicated by the expedited storage message. In some examples, the memory system may determine whether the data is associated with the file based on a file indicator associated with the data (e.g., included in a write command for the data). In other examples, the memory system may determine whether the data is associated with the file based on the data being received within a window of time reserved for transfer of the file (e.g., as indicated by a file start message as described with reference to FIG. 3).

If, at 440, it is determined that the data is not associated with the file, the memory system may proceed to 445 and store the data using the address-based write procedure. If, at 440, it is determined that the data is associated with the file, the memory system may proceed to 450. At 450, the memory system may store the data in a suitably fragmented block identified using the fragmentation-based write procedure. Thus, the memory system implement a fragmentation-based write procedure for a file.

Alternative examples of the foregoing may be implemented, where some operations are performed in a different order than described, are performed in parallel, or are not performed at all. In some cases, operations may include additional features not mentioned below, or further operations may be added. Additionally, some operations may be performed multiple times or some combinations of operations may repeat or cycle.

Figure 5:
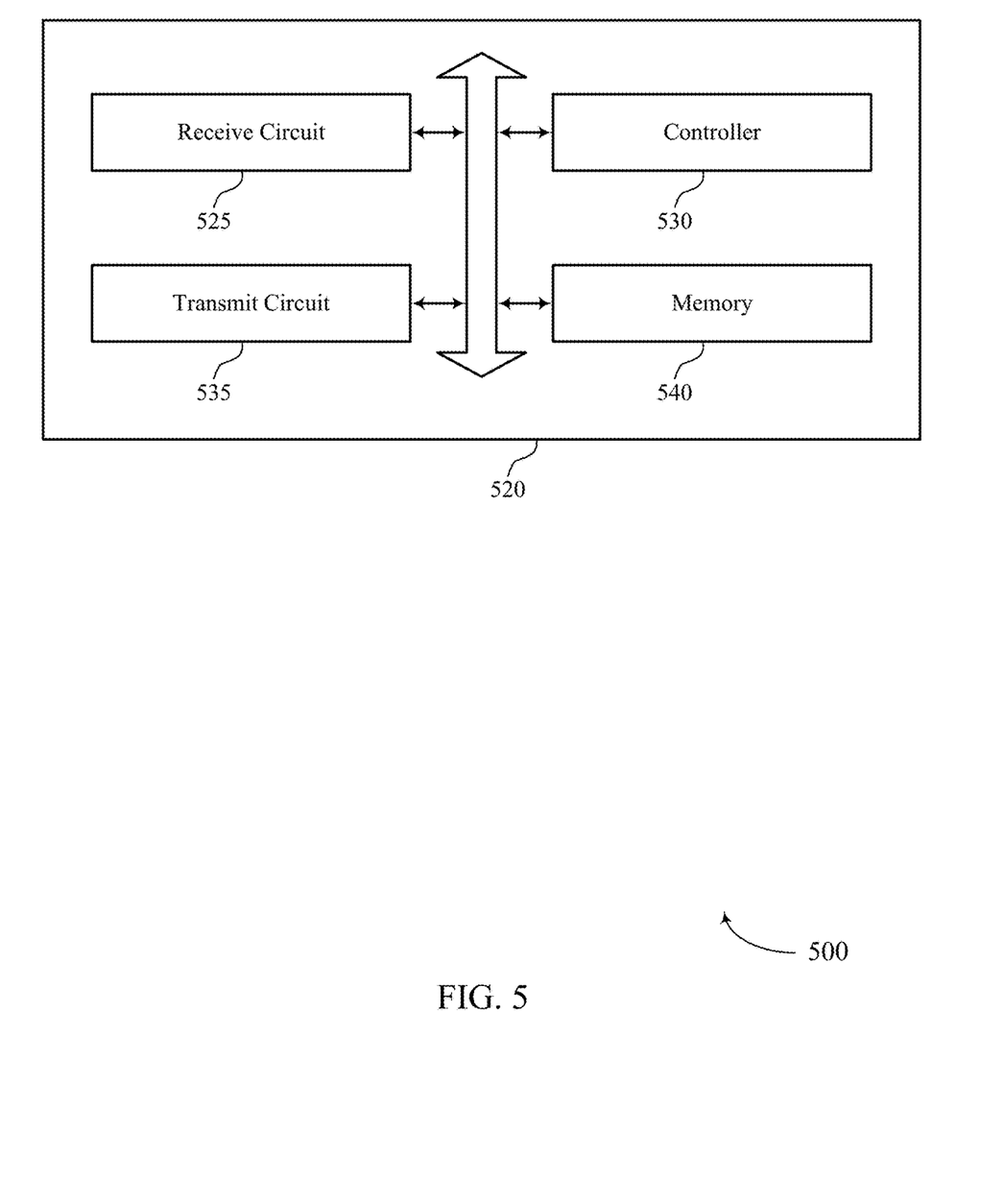
FIG. 5 shows a block diagram of a memory system that supports access of a memory system based on fragmentation in accordance with examples as disclosed herein.

FIG. 5 shows a block diagram 500 of an apparatus 520 that supports access of a memory system based on fragmentation in accordance with examples as disclosed herein. The apparatus 520 may be an example of aspects of a memory system as described with reference to FIGS. 1 through 4. The apparatus 520, or various components thereof, may be an example of means for performing various aspects of access of a memory system based on fragmentation as described herein. For example, the apparatus 520 may include a receive circuit 525, a controller 530, a transmit circuit 535, a memory 540, or any combination thereof. Each of these components may communicate, directly or indirectly, with one another (e.g., via one or more buses).

The receive circuit 525 may be or include a data bus, a data bus interface, logic, circuitry, a processor, a controller, or other components capable of performing the functions described herein. The controller 530 may be or include logic, circuitry, a processor, a controller, or other components capable of performing the functions described herein. The transmit circuit 535 may be or include a data bus, a data bus interface, logic, circuitry, a processor, a controller, or other components capable of performing the functions described herein. The memory 540 may be or include a memory die, a memory device, or other components capable of performing the functions described herein.

The receive circuit 525 may be configured as or otherwise support a means for receiving, from a host system, a first message indicating a set of data pending at the host system that the memory system is to store using a first write procedure different than a second write procedure. The controller 530 may be configured as or otherwise support a means for determining blocks of a memory device that satisfy a fragmentation threshold based at least in part on receiving the first message. The transmit circuit 535 may be configured as or otherwise support a means for transmitting, to the host system after determining the blocks, a second message that indicates the memory system is ready to receive the set of data indicated in the first message. The memory 540 may be configured as or otherwise support a means for storing the set of data in the determined blocks based at least in part on transmitting the second message.

In some examples, the first message indicates a size of the set of data, and the controller 530 may be configured as or otherwise support a means for determining the fragmentation threshold based at least in part on the size of the set of data, where determining the blocks that satisfy the fragmentation threshold is based at least in part on determining the fragmentation threshold.

In some examples, the first message indicates a size of the set of data, and the controller 530 may be configured as or otherwise support a means for determining a quantity of blocks for storing the set of data based at least in part on the size of the set of data, where determining the blocks that satisfy the fragmentation threshold is based at least in part on determining the quantity of blocks.

In some examples, the controller 530 may be configured as or otherwise support a means for determining whether a block of the blocks stores less than a threshold amount of data, where the block is determined to satisfy the fragmentation threshold based at least in part on determining that the block stores less than the threshold amount of data.

In some examples, the controller 530 may be configured as or otherwise support a means for determining whether a block of the blocks includes a threshold quantity of sequential pages available for writing, where the block is determined to satisfy the fragmentation threshold based at least in part on determining that the block includes the threshold quantity of sequential pages available for writing.

In some examples, the controller 530 may be configured as or otherwise support a means for comparing a mapping that indicates fragmentation information for a set of blocks that includes the blocks with identifiers associated with the blocks, where determining the blocks that satisfy the fragmentation threshold is based at least in part on comparing the mapping with the identifiers.

In some examples, the fragmentation information is indicated on a per-block basis and includes an amount of data stored in a block, a quantity of sequential pages that are available for writing in a block, a ratio of valid data to invalid data stored in a block, or a combination thereof.

In some examples, the receive circuit 525 may be configured as or otherwise support a means for receiving, from the host system, a third message from the host system indicating a start time for communication of the set of data from the host system to the memory system based at least in part on transmitting the second message.

In some examples, the receive circuit 525 may be configured as or otherwise support a means for receiving, from the host system for a subset of the set of data, a write command indicating that the subset is included in the set of data, where storing the set of data includes storing the subset in one or more of the determined blocks based at least in part on the write command indicating that the subset is included in the set of data.

In some examples, the first message indicates a file identifier, and the controller 530 may be configured as or otherwise support a means for verifying an authority of the host system to transmit the first message based at least in part on the file identifier, where the set of data is stored in the blocks based at least in part on verifying the authority of the host system.

In some examples, the first write procedure uses the fragmentation threshold as a basis for storing data and. In some examples, the second write procedure is independent of the fragmentation threshold.

In some examples, determining the fragmentation threshold based at least in part on the size of the set of data, where determining the blocks that satisfy the fragmentation threshold is based at least in part on determining the fragmentation threshold.

In some examples, determining a quantity of blocks for storing the set of data based at least in part on the size of the set of data, where determining the blocks that satisfy the fragmentation threshold is based at least in part on determining the quantity of blocks.

Figure 6:
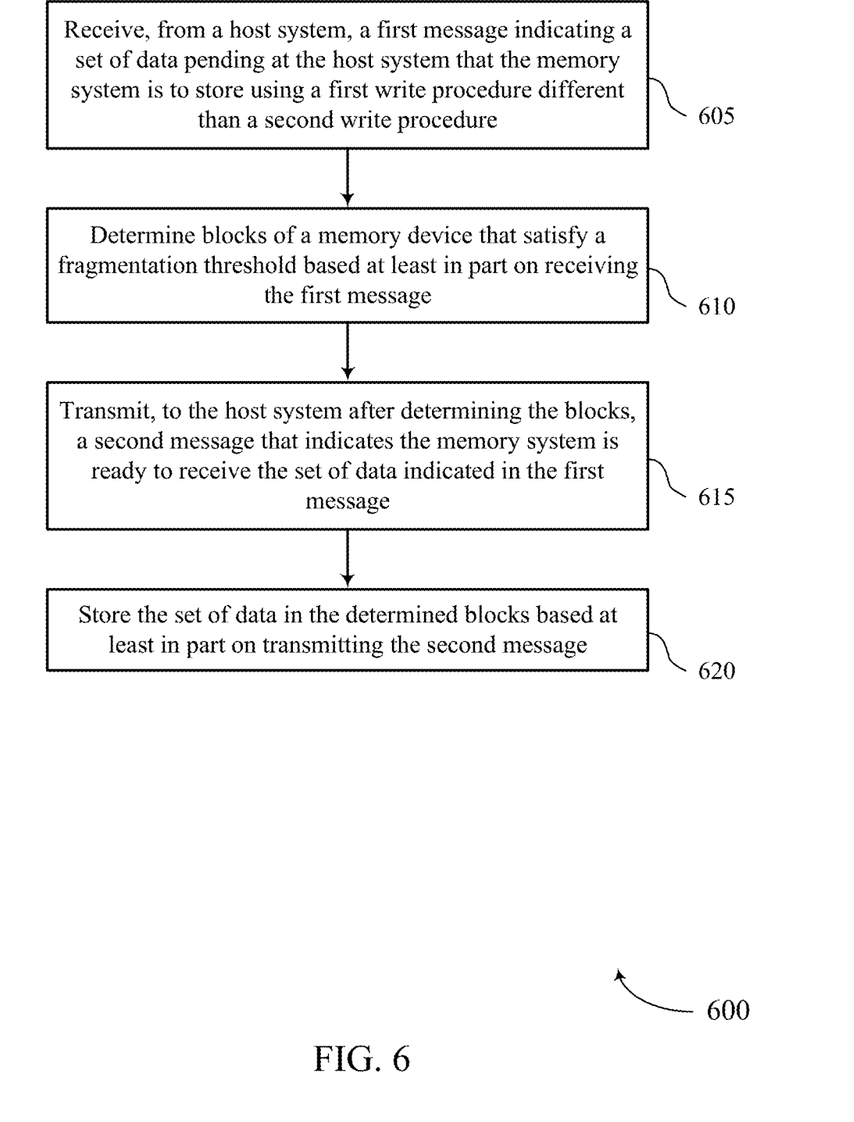
FIG. 6 shows a flowchart illustrating a method or methods that support access of a memory system based on fragmentation in accordance with examples as disclosed herein.

FIG. 6 shows a flowchart illustrating a method 600 that supports access of a memory system based on fragmentation in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving, from a host system, a first message indicating a set of data pending at the host system that the memory system is to store using a first write procedure different than a second write procedure. The operations of 605 may be performed in accordance with examples as disclosed herein. In some examples, aspects of the operations of 605 may be performed by a receive circuit 525 as described with reference to FIG. 5.

At 610, the method may include determining blocks of a memory device that satisfy a fragmentation threshold based at least in part on receiving the first message. The operations of 610 may be performed in accordance with examples as disclosed herein. In some examples, aspects of the operations of 610 may be performed by a controller 530 as described with reference to FIG. 5.

At 615, the method may include transmitting, to the host system after determining the blocks, a second message that indicates the memory system is ready to receive the set of data indicated in the first message. The operations of 615 may be performed in accordance with examples as disclosed herein. In some examples, aspects of the operations of 615 may be performed by a transmit circuit 535 as described with reference to FIG. 5.

At 620, the method may include storing the set of data in the determined blocks based at least in part on transmitting the second message. The operations of 620 may be performed in accordance with examples as disclosed herein. In some examples, aspects of the operations of 620 may be performed by a memory 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, from a host system, a first message indicating a set of data pending at the host system that the memory system is to store using a first write procedure different than a second write procedure, determining blocks of a memory device that satisfy a fragmentation threshold based at least in part on receiving the first message, transmitting, to the host system after determining the blocks, a second message that indicates the memory system is ready to receive the set of data indicated in the first message, and storing the set of data in the determined blocks based at least in part on transmitting the second message.

In some examples of the method 600 and the apparatus described herein, the first message indicates a size of the set of data and the method, apparatuses, and non-transitory computer-readable medium may include further operations, features, circuitry, logic, means, or instructions for determining the fragmentation threshold based at least in part on the size of the set of data, where determining the blocks that satisfy the fragmentation threshold may be based at least in part on determining the fragmentation threshold.

In some examples of the method 600 and the apparatus described herein, the first message indicates a size of the set of data and the method, apparatuses, and non-transitory computer-readable medium may include further operations, features, circuitry, logic, means, or instructions for determining a quantity of blocks for storing the set of data based at least in part on the size of the set of data, where determining the blocks that satisfy the fragmentation threshold may be based at least in part on determining the quantity of blocks.

Some examples of the method 600 and the apparatus described herein may further include operations, features, circuitry, logic, means, or instructions for determining whether a block of the blocks stores less than a threshold amount of data, where the block may be determined to satisfy the fragmentation threshold based at least in part on determining that the block stores less than the threshold amount of data.

Some examples of the method 600 and the apparatus described herein may further include operations, features, circuitry, logic, means, or instructions for determining whether a block of the blocks includes a threshold quantity of sequential pages available for writing, where the block may be determined to satisfy the fragmentation threshold based at least in part on determining that the block includes the threshold quantity of sequential pages available for writing.

Some examples of the method 600 and the apparatus described herein may further include operations, features, circuitry, logic, means, or instructions for comparing a mapping that indicates fragmentation information for a set of blocks that includes the blocks with identifiers associated with the blocks, where determining the blocks that satisfy the fragmentation threshold may be based at least in part on comparing the mapping with the identifiers.

In some examples of the method 600 and the apparatus described herein, the fragmentation information may be indicated on a per-block basis and includes an amount of data stored in a block, a quantity of sequential pages that may be available for writing in a block, a ratio of valid data to invalid data stored in a block, or a combination thereof.

Some examples of the method 600 and the apparatus described herein may further include operations, features, circuitry, logic, means, or instructions for receiving, from the host system, a third message from the host system indicating a start time for communication of the set of data from the host system to the memory system based at least in part on transmitting the second message.

Some examples of the method 600 and the apparatus described herein may further include operations, features, circuitry, logic, means, or instructions for receiving, from the host system for a subset of the set of data, a write command indicating that the subset may be included in the set of data, where storing the set of data includes storing the subset in one or more of the determined blocks based at least in part on the write command indicating that the subset may be included in the set of data.

In some examples of the method 600 and the apparatus described herein, the first message indicates a file identifier and the method, apparatuses, and non-transitory computer-readable medium may include further operations, features, circuitry, logic, means, or instructions for verifying an authority of the host system to transmit the first message based at least in part on the file identifier, where the set of data may be stored in the blocks based at least in part on verifying the authority of the host system.

In some examples of the method 600 and the apparatus described herein, the first write procedure uses the fragmentation threshold as a basis for storing data and the second write procedure may be independent of the fragmentation threshold.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device and configured to cause the apparatus to receive, from a host system, a first message indicating a set of data pending at the host system that the apparatus is to store using a first write procedure different than a second write procedure, determine blocks of the memory device that satisfy a fragmentation threshold based at least in part on receiving the first message, transmit, to the host system after determining the blocks, a second message that indicates the apparatus is ready to receive the set of data indicated in the first message, and store the set of data in the determined blocks based at least in part on transmitting the second message In some examples, the apparatus may include determining the fragmentation threshold based at least in part on the size of the set of data, where determining the blocks that satisfy the fragmentation threshold may be based at least in part on determining the fragmentation threshold.

In some examples, the apparatus may include determining a quantity of blocks for storing the set of data based at least in part on the size of the set of data, where determining the blocks that satisfy the fragmentation threshold may be based at least in part on determining the quantity of blocks.

In some examples, the apparatus may include determining whether a block of the blocks stores less than a threshold amount of data, where the block may be determined to satisfy the fragmentation threshold based at least in part on determining that the block stores less than the threshold amount of data.

In some examples, the apparatus may include determining whether a block of the blocks includes a threshold quantity of sequential pages available for writing, where the block may be determined to satisfy the fragmentation threshold based at least in part on determining that the block includes the threshold quantity of sequential pages available for writing.

In some examples, the apparatus may include comparing a mapping that indicates fragmentation information for a set of blocks that includes the blocks with identifiers associated with the blocks, where determining the blocks that satisfy the fragmentation threshold may be based at least in part on comparing the mapping with the identifiers.

In some examples of the apparatus, the fragmentation information may be indicated on a per-block basis and includes an amount of data stored in a block, a quantity of sequential pages that may be available for writing in a block, a ratio of valid data to invalid data stored in a block, or a combination thereof.

In some examples, the apparatus may include receiving, from the host system, a third message from the host system indicating a start time for communication of the set of data from the host system to the apparatus based at least in part on transmitting the second message.

In some examples, the apparatus may include receiving, from the host system for a subset of the set of data, a write command indicating that the subset may be included in the set of data, where storing the set of data includes storing the subset in one or more of the determined blocks based at least in part on the write command indicating that the subset may be included in the set of data.

In some examples, the apparatus may include verifying an authority of the host system to transmit the first message based at least in part on the file identifier, where the set of data may be stored in the blocks based at least in part on verifying the authority of the host system.

In some examples of the apparatus, the first write procedure uses the fragmentation threshold as a basis for storing data and the second write procedure may be independent of the fragmentation threshold.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
receive, from a host system, a first message indicating a set of data pending at the host system that the apparatus is to store using a first write procedure different than a second write procedure;
determine blocks of the memory device that satisfy a fragmentation threshold based at least in part on receiving the first message;
transmit, to the host system after determining the blocks, a second message that indicates the apparatus is ready to receive the set of data indicated in the first message; and
store the set of data in the determined blocks based at least in part on transmitting the second message.

2. The apparatus of claim 1, wherein the first message indicates a size of the set of data, and wherein the controller is further configured to cause the apparatus to:
determine the fragmentation threshold based at least in part on the size of the set of data, wherein determining the blocks that satisfy the fragmentation threshold is based at least in part on determining the fragmentation threshold.

3. The apparatus of claim 1, wherein the first message indicates a size of the set of data, and wherein the controller is further configured to cause the apparatus to:
determine a quantity of blocks for storing the set of data based at least in part on the size of the set of data, wherein determining the blocks that satisfy the fragmentation threshold is based at least in part on determining the quantity of blocks.

4. The apparatus of claim 1, wherein the controller is further configured to cause the apparatus to:
determine whether a block of the blocks stores less than a threshold amount of data, wherein the block is determined to satisfy the fragmentation threshold based at least in part on determining that the block stores less than the threshold amount of data.

5. The apparatus of claim 1, wherein the controller is further configured to cause the apparatus to:
determine whether a block of the blocks comprises a threshold quantity of sequential pages available for writing, wherein the block is determined to satisfy the fragmentation threshold based at least in part on determining that the block comprises the threshold quantity of sequential pages available for writing.

6. The apparatus of claim 1, wherein the controller is further configured to cause the apparatus to:
compare a mapping that indicates fragmentation information for a set of blocks that includes the blocks with identifiers associated with the blocks, wherein determining the blocks that satisfy the fragmentation threshold is based at least in part on comparing the mapping with the identifiers.

7. The apparatus of claim 6, wherein the fragmentation information is indicated on a per-block basis and comprises an amount of data stored in a block, a quantity of sequential pages that are available for writing in a block, a ratio of valid data to invalid data stored in a block, or a combination thereof.

8. The apparatus of claim 1, wherein the controller is further configured to cause the apparatus to:
receive, from the host system, a third message from the host system indicating a start time for communication of the set of data from the host system to the apparatus based at least in part on transmitting the second message.

9. The apparatus of claim 1, wherein the controller is further configured to cause the apparatus to:
receive, from the host system for a subset of the set of data, a write command indicating that the subset is included in the set of data, wherein storing the set of data comprises storing the subset in one or more of the determined blocks based at least in part on the write command indicating that the subset is included in the set of data.

10. The apparatus of claim 1, wherein the first message indicates a file identifier, wherein the controller is further configured to cause the apparatus to:
verify an authority of the host system to transmit the first message based at least in part on the file identifier, wherein the set of data is stored in the blocks based at least in part on verifying the authority of the host system.

11. The apparatus of claim 1, wherein the first write procedure uses the fragmentation threshold as a basis for storing data and the second write procedure is independent of the fragmentation threshold.

12. A method performed by a memory system, comprising:
receiving, from a host system, a first message indicating a set of data pending at the host system that the memory system is to store using a first write procedure different than a second write procedure;
determining blocks of a memory device that satisfy a fragmentation threshold based at least in part on receiving the first message;
transmitting, to the host system after determining the blocks, a second message that indicates the memory system is ready to receive the set of data indicated in the first message; and
storing the set of data in the determined blocks based at least in part on transmitting the second message.

13. The method of claim 12, wherein the first message indicates a size of the set of data, the method further comprising:
determining the fragmentation threshold based at least in part on the size of the set of data, wherein determining the blocks that satisfy the fragmentation threshold is based at least in part on determining the fragmentation threshold.

14. The method of claim 12, wherein the first message indicates a size of the set of data, the method further comprising:
determining a quantity of blocks for storing the set of data based at least in part on the size of the set of data, wherein determining the blocks that satisfy the fragmentation threshold is based at least in part on determining the quantity of blocks.

15. The method of claim 12, further comprising:
determining whether a block of the blocks stores less than a threshold amount of data, wherein the block is determined to satisfy the fragmentation threshold based at least in part on determining that the block stores less than the threshold amount of data.

16. The method of claim 12, further comprising:
determining whether a block of the blocks comprises a threshold quantity of sequential pages available for writing, wherein the block is determined to satisfy the fragmentation threshold based at least in part on determining that the block comprises the threshold quantity of sequential pages available for writing.

17. The method of claim 12, further comprising:
comparing a mapping that indicates fragmentation information for a set of blocks that includes the blocks with identifiers associated with the blocks, wherein determining the blocks that satisfy the fragmentation threshold is based at least in part on comparing the mapping with the identifiers.

18. The method of claim 17, wherein the fragmentation information is indicated on a per-block basis and comprises an amount of data stored in a block, a quantity of sequential pages that are available for writing in a block, a ratio of valid data to invalid data stored in a block, or a combination thereof.

19. The method of claim 12, further comprising:
receiving, from the host system, a third message from the host system indicating a start time for communication of the set of data from the host system to the memory system based at least in part on transmitting the second message.

20. The method of claim 12, further comprising:
receiving, from the host system for a subset of the set of data, a write command indicating that the subset is included in the set of data, wherein storing the set of data comprises storing the subset in one or more of the determined blocks based at least in part on the write command indicating that the subset is included in the set of data.

21. The method of claim 12, wherein the first message indicates a file identifier, the method further comprising:
verifying an authority of the host system to transmit the first message based at least in part on the file identifier, wherein the set of data is stored in the blocks based at least in part on verifying the authority of the host system.

22. The method of claim 12, wherein the first write procedure uses the fragmentation threshold as a basis for storing data and the second write procedure is independent of the fragmentation threshold.

23. A non-transitory computer-readable medium storing code comprising instructions which, when executed by a processor of a memory system, cause the memory system to:
receive, from a host system, a first message indicating a set of data pending at the host system that the memory system is to store using a first write procedure different than a second write procedure;
determine blocks of a memory device that satisfy a fragmentation threshold based at least in part on receiving the first message;
transmit, to the host system after determining the blocks, a second message that indicates the memory system is ready to receive the set of data indicated in the first message; and
store the set of data in the determined blocks based at least in part on transmitting the second message.

24. The non-transitory computer-readable medium of claim 23, wherein the first message indicates a size of the set of data, and wherein the instructions, when executed by the processor of the memory system, further cause the memory system to:
determine the fragmentation threshold based at least in part on the size of the set of data, wherein determining the blocks that satisfy the fragmentation threshold is based at least in part on determining the fragmentation threshold.

25. The non-transitory computer-readable medium of claim 23, wherein the first message indicates a size of the set of data, and wherein the instructions, when executed by the processor of the memory system, further cause the memory system to:
determine a quantity of blocks for storing the set of data based at least in part on the size of the set of data, wherein determining the blocks that satisfy the fragmentation threshold is based at least in part on determining the quantity of blocks.

\* \* \* \* \*